US011335326B2

(12) United States Patent
Liljestrand et al.

(10) Patent No.: US 11,335,326 B2
(45) Date of Patent: May 17, 2022

(54) SYSTEMS AND METHODS FOR GENERATING AUDIBLE VERSIONS OF TEXT SENTENCES FROM AUDIO SNIPPETS

(71) Applicant: Spotify AB, Stockholm (SE)

(72) Inventors: Anders Erik Jonatan Liljestrand, Gothenburg (SE); Bo Andreas Romin, Uddevalla (SE)

(73) Assignee: Spotify AB, Stockholm (SE)

( * ) Notice: Subject to any disclaimer, the term of this patent is extended or adjusted under 35 U.S.C. 154(b) by 35 days.

(21) Appl. No.: 16/874,560

(22) Filed: May 14, 2020

(65) Prior Publication Data

US 2021/0358474 A1 Nov. 18, 2021

(51) Int. Cl.
*G10L 13/00* (2006.01)
*G10L 13/08* (2013.01)

(52) U.S. Cl.
CPC .................... *G10L 13/08* (2013.01)

(58) Field of Classification Search
CPC ................. G10L 13/08; G10L 13/00
See application file for complete search history.

(56) References Cited

U.S. PATENT DOCUMENTS

| | | | | |
|---|---|---|---|---|
| 5,633,983 A * | 5/1997 | Coker | ...................... | G10L 13/08 704/258 |
| 10,068,557 B1 * | 9/2018 | Engel | ........................ | G06N 3/04 |
| 10,178,365 B1 * | 1/2019 | Singh | .................... | H04N 21/233 |
| 11,017,763 B1 * | 5/2021 | Aggarwal | ............... | G10L 13/08 |
| 2003/0074196 A1 * | 4/2003 | Kamanaka | .............. | G10L 13/07 704/260 |
| 2004/0159221 A1 * | 8/2004 | Camiel | ..................... | G10H 1/40 84/660 |
| 2007/0289432 A1 | 12/2007 | Basu et al. | | |
| 2008/0082576 A1 * | 4/2008 | Bodin | .................. | G11B 27/105 |
| 2008/0097633 A1 * | 4/2008 | Jochelson | .......... | A63B 71/0686 700/94 |
| 2008/0249644 A1 * | 10/2008 | Jehan | .................... | G11B 27/322 700/94 |
| 2011/0246186 A1 * | 10/2011 | Takeda | ................... | G10H 1/368 704/201 |
| 2012/0033132 A1 * | 2/2012 | Chen | ........................ | H04N 5/04 348/462 |
| 2012/0132057 A1 | 5/2012 | Kristensen | | |
| 2013/0019738 A1 | 1/2013 | Haupt et al. | | |

(Continued)

*Primary Examiner* — Jakieda R Jackson
(74) *Attorney, Agent, or Firm* — Morgan, Lewis & Bockius LLP

(57) ABSTRACT

A method is performed at a server system of a media-providing service. The server system has one or more processors and memory storing instructions for execution by the one or more processors. The method includes receiving a text sentence including a plurality of words from a device of a first user and extracting a plurality of audio snippets from one or more audio tracks. A respective audio snippet in the plurality of audio snippets corresponds to one or more words in the plurality of words of the text sentence. The method also includes assembling the plurality of audio snippets in a first order to produce an audible version of the text sentence. The method further includes providing, for playback at the device of the first user, the audible version of the text sentence including the plurality of audio snippets in the first order.

18 Claims, 8 Drawing Sheets

(56) References Cited

U.S. PATENT DOCUMENTS

| | | | |
|---|---|---|---|
| 2013/0262096 A1* | 10/2013 | Wilhelms-Tricarico | G10L 13/04 |
| | | | 704/202 |
| 2015/0067507 A1* | 3/2015 | Bohrer | G06F 16/638 |
| | | | 715/716 |
| 2015/0073805 A1* | 3/2015 | Stern | G10L 13/047 |
| | | | 704/260 |
| 2016/0188577 A1* | 6/2016 | Houh | G06F 16/583 |
| | | | 707/746 |
| 2018/0053510 A1 | 2/2018 | Kofman et al. | |
| 2018/0096677 A1* | 4/2018 | Pollet | G06N 3/0454 |
| 2018/0359198 A1* | 12/2018 | Eidem | H04L 67/306 |
| 2019/0189109 A1* | 6/2019 | Yuan | G10L 13/08 |
| 2019/0222803 A1* | 7/2019 | Pather | H04N 21/42204 |
| 2019/0335283 A1* | 10/2019 | Chaudhary | G06F 3/162 |
| 2021/0027761 A1* | 1/2021 | Witherspoon | G06N 3/08 |

\* cited by examiner

SYSTEMS AND METHODS FOR GENERATING AUDIBLE VERSIONS OF TEXT SENTENCES FROM AUDIO SNIPPETS

TECHNICAL FIELD

The disclosed embodiments relate generally to media playback, and, in particular, to generating an audible version of a text sentence.

BACKGROUND

Access to electronic media, such as music and audiobook content, has expanded dramatically over time. As a departure from physical media, media content providers stream media to electronic devices across wireless networks, improving the convenience with which users can digest and experience such content.

There is an increased interest for media content providers to allow users to customize the electronic media that they consume as well as generate their own electronic media.

SUMMARY

There is a need for systems and methods for generating audible versions of text sentences (e.g., text to speech synthesis) for playback on a user device. Given a sentence of words, some embodiments of the present disclosure locate these words in available audio media (e.g., songs) and extract audio snippets corresponding to the words from the available audio media. The snippets are then processed and merged in the order of the supplied words, resulting in a new audio track that is vocalized (e.g., played back) back to the user.

In accordance with some embodiments, a method is performed at a server system (e.g., of a media-providing service). The server system has one or more processors and memory storing instructions for execution by the one or more processors. The method includes receiving a text sentence including a plurality of words from a device of a first user and extracting a plurality of audio snippets from one or more audio tracks. A respective audio snippet in the plurality of audio snippets corresponds to one or more words in the plurality of words of the text sentence. The method also includes assembling the plurality of audio snippets in a first order to produce an audible version of the text sentence. The method further includes providing, for playback at the device of the first user, the audible version of the text sentence including the plurality of audio snippets in the first order.

In accordance with some embodiments, a server system (e.g., of a media-providing service) has one or more processors and memory storing instructions for execution by the one or more processors. The instructions include instructions for receiving a text sentence including a plurality of words from a device of a first user and extracting a plurality of audio snippets from one or more audio tracks. A respective audio snippet in the plurality of audio snippets corresponds to one or more words in the plurality of words of the text sentence. The instructions also include instructions for assembling the plurality of audio snippets in a first order to produce an audible version of the text sentence and providing, for playback at the device of the first user, the audible version of the text sentence. The audible version of the text sentence includes the plurality of audio snippets in the first order.

In accordance with some embodiments, a non-transitory computer-readable storage medium stores instructions that, when executed by a server system, cause the server system to receive a text sentence including a plurality of words from a device of a first user and extract a plurality of audio snippets from one or more audio tracks. A respective audio snippet in the plurality of audio snippets corresponds to one or more words in the plurality of words of the text sentence. The instructions also cause the server system to assemble the plurality of audio snippets in a first order to produce an audible version of the text sentence and provide, for playback at the device of the first user, the audible version of the text sentence. The audible version of the text sentence includes the plurality of audio snippets in the first order.

Thus, systems are provided with improved methods for generating audible versions of text sentences for playback at a user device.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
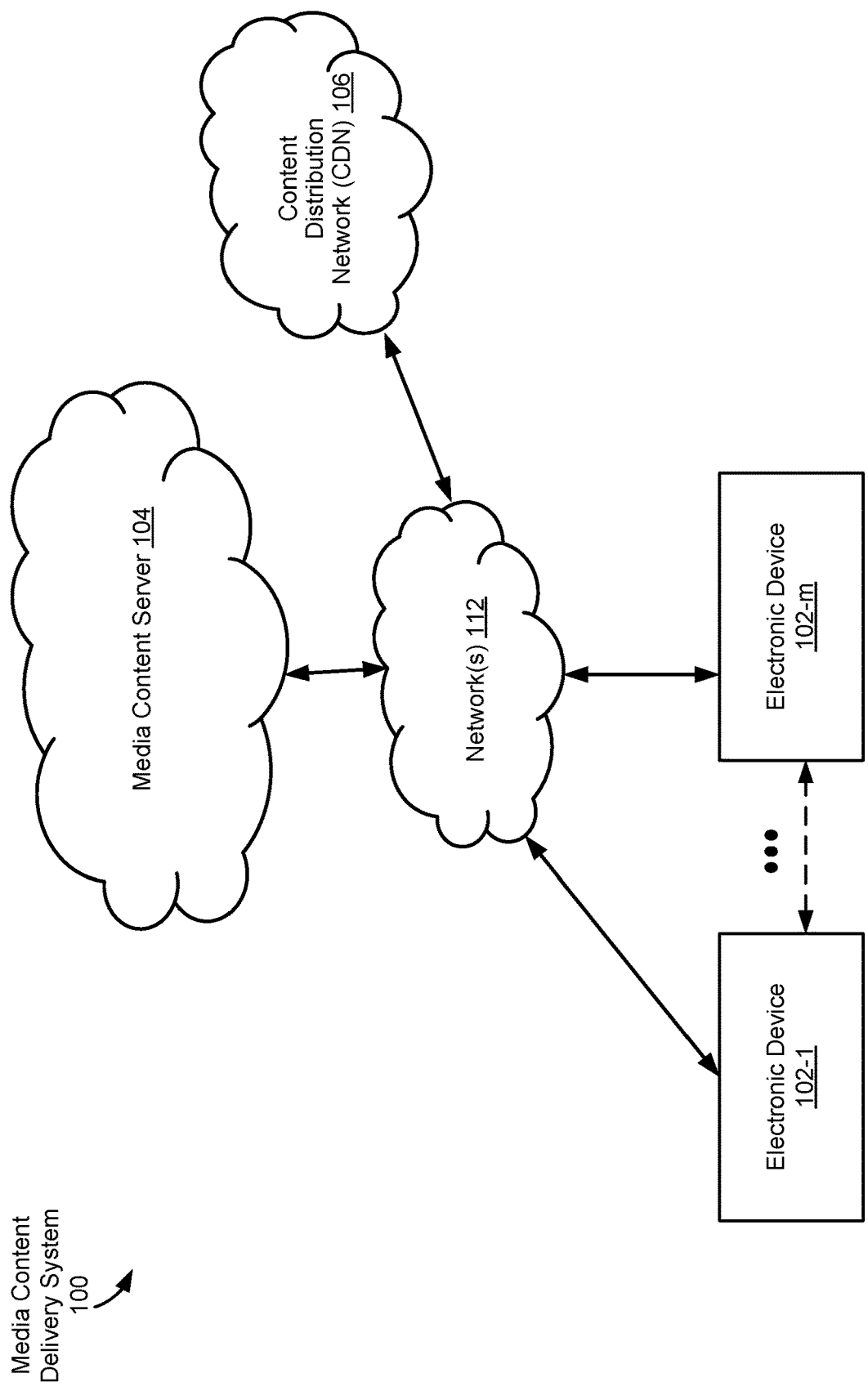
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. For example, content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
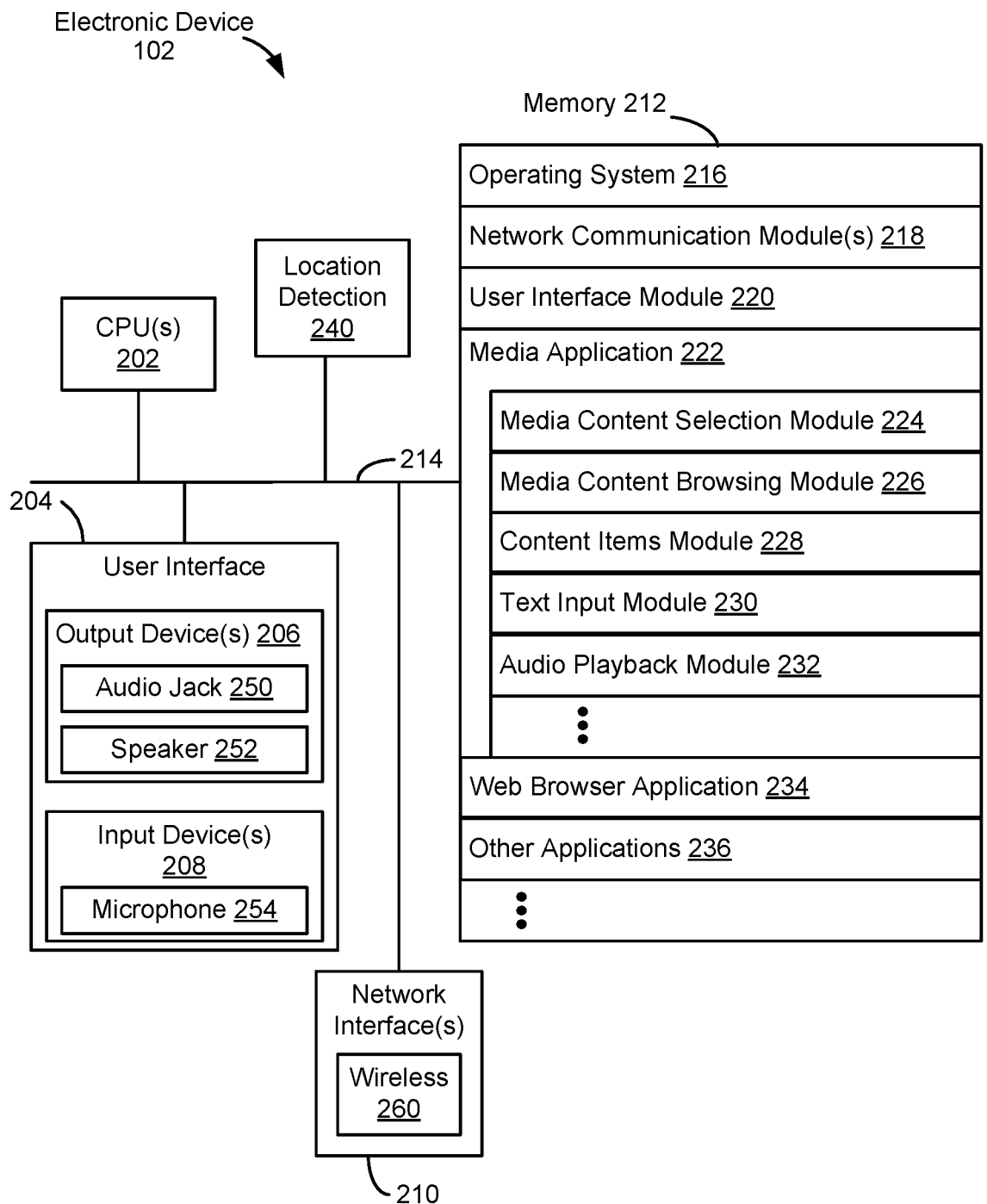
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone 254 and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

- a media content selection module 224 for selecting one or more media content items and/or sending, to the media content server, an indication of the selected media content item(s);
- a media content browsing module 226 for providing controls and/or user interfaces enabling a user to navigate, select for playback, and otherwise control or interact with media content, whether the media content is stored or played locally or remotely;
- a content items module 228 for processing uploaded media items and storing media items for playback and/or for forwarding to the media content server;
- a text input module 230 for providing text sentences (e.g., text strings or text phrases including a plurality of words) to the media content server; and
- an audio playback module 232 for playing audible versions of the provided text sentences.

a web browser application 234 (e.g., Internet Explorer or Edge by Microsoft, Firefox by Mozilla, Safari by Apple, or Chrome by Google) for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
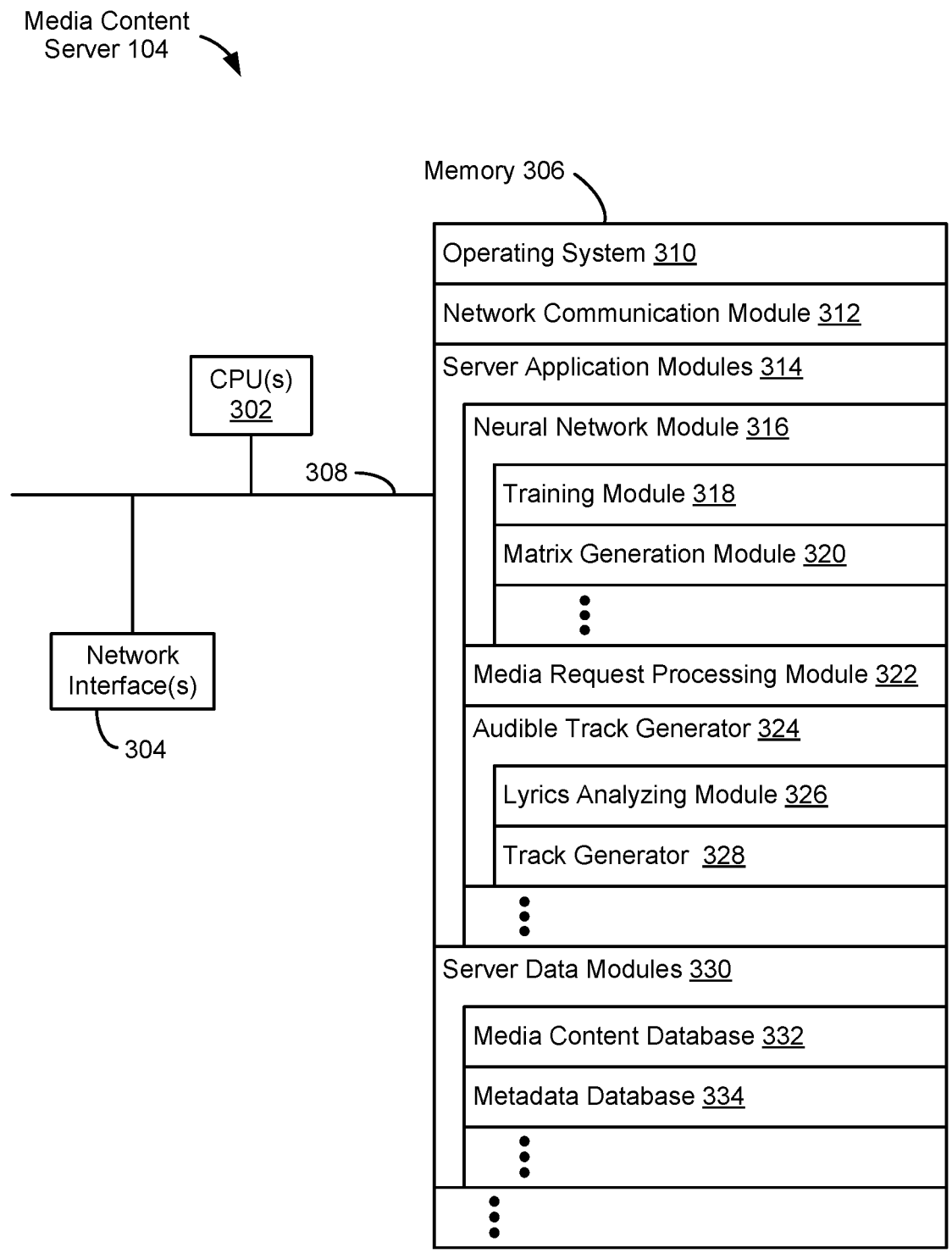
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 including, but not limited to, one or more of:
  - a neural network module 316 for training and/or storing a neural network, the neural network module 316 including, but not limited to, one or more of:
    - a training module 318 for training, using training data, the neural network; and
    - a matrix generation module 320 for generating and/or storing one or more textual unit probability matrices; and
  - a media request processing module 322 for processing requests for media content and facilitating access to requested media items by electronic devices (e.g., the electronic device 102) including, optionally, streaming media content to such devices;
  - an audible track generator 324 for creating audible versions of text sentences received from electronic devices (e.g., the electronic device 102), including, but not limited to, one or more of:
    - a lyrics analyzing module 326 for identifying audio tracks from an audio track database that include words included in a text sentence received from an electronic device and obtaining timing data for the respective words; and
    - a track generator module 328 for extracting audio snippets from the audio tracks and assembling the one or more audio snippets to form an audible version of a text sentence;
- one or more server data module(s) 330 for handling the storage of and/or access to media items and/or metadata relating to the media items; in some embodiments, the one or more server data module(s) 330 include:
  - a media content database 332 for storing media items;
  - a metadata database 334 for storing metadata relating to the media items; and
  - a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores a subset or superset of the respective modules and data structures described with regard to memory 306. In some embodiments, memory 306 stores a subset or superset of the respective modules and data structures described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein.

In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 is stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
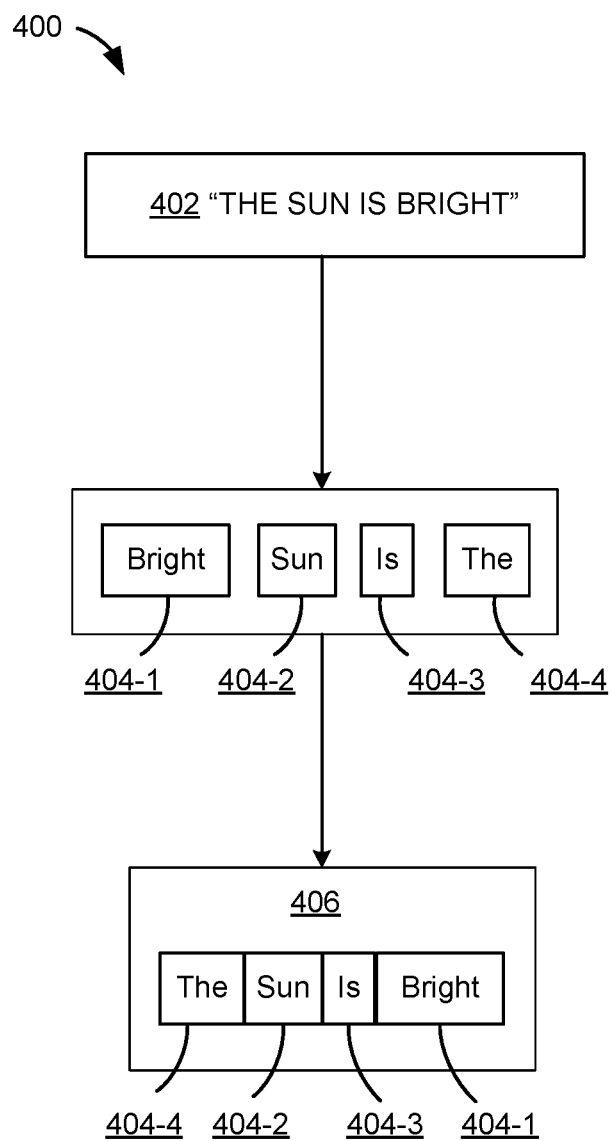
FIG. 4 is a block diagram illustrating a method for performing speech synthesis, in accordance with some embodiments

FIG. 4 is a block diagram illustrating a method 400 for performing speech synthesis, in accordance with some embodiments. Method 400 generates audible versions of text sentences (e.g., synthesizes speech) based on processed, assembled and merged audio snippets extracted from audio tracks. Method 400 includes receiving a text sentence including a plurality of words (e.g., text sentence 404 including the phrase "the sun is bright"). Method 400 includes locating a respective audio version of each of the plurality of words from one or more audio tracks (e.g., songs, audiobooks, and/or podcasts). In the event that the text was received in audio format (e.g., through the users speech), the audio tracks are distinct from the text (e.g., the words are identified in audio tracks other than what was provided by the user). The respective audio versions for each of the plurality of words are then extracted as individual audio snippets (e.g., audio snippets 404-1, 404-2, 404-3, and 404-4). The individual audio snippets are assembled in an order corresponding to the order of the plurality of words in text sentence and merged to form an audible version of the text sentence (e.g., audible version 406 of text sentence 402, "The sun is bright").

Figure 5:
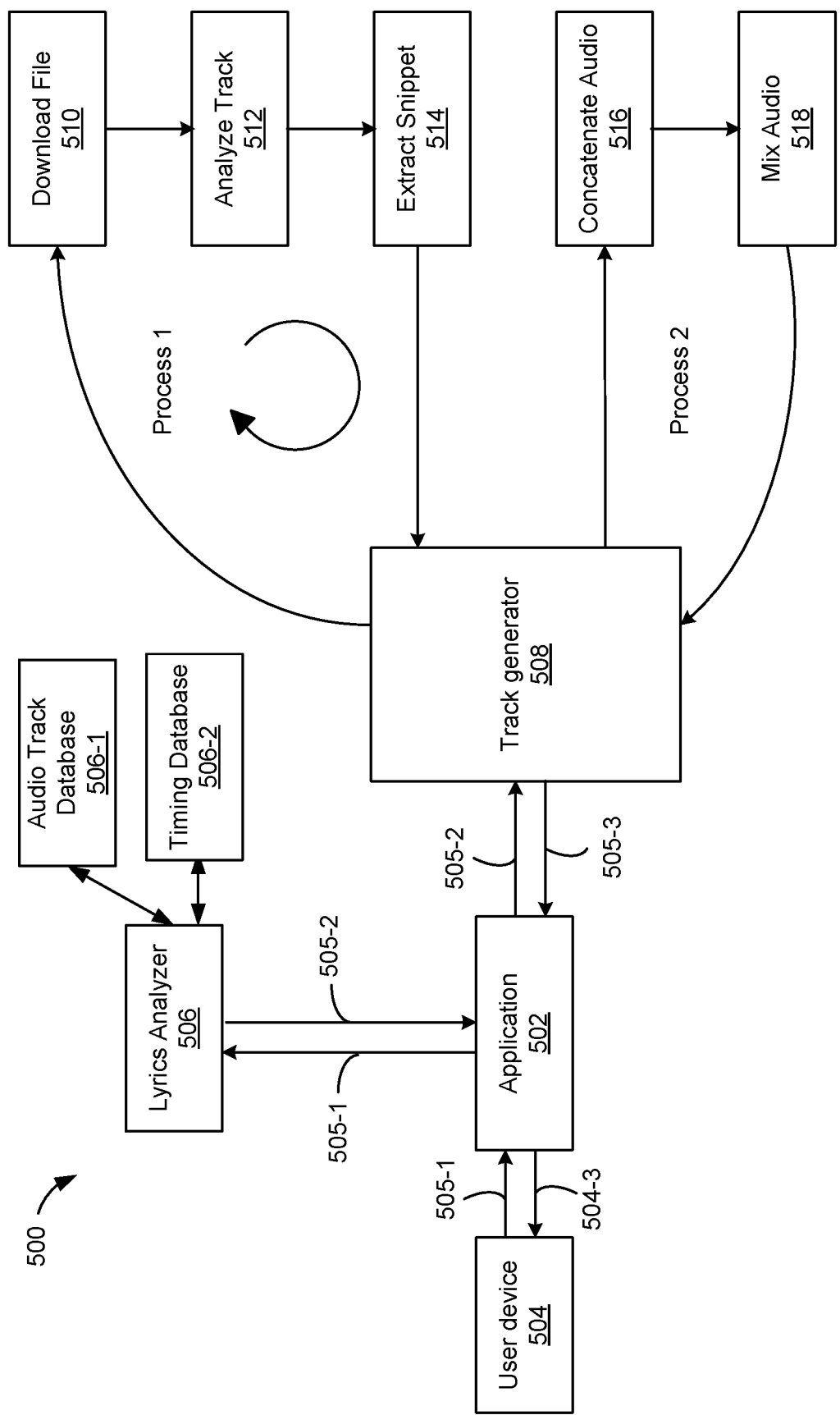
FIG. 5 is a block diagram illustrating a system for generating an audible version of a text sentence, in accordance with some embodiments.

FIG. 5 is a block diagram illustrating a system 500 for generating an audible version of a text sentence, in accordance with some embodiments. In some embodiments, system 500 includes an application 502 (e.g., server application module 314 described with respect to FIG. 3) in communication with a user device 504 (e.g., electronic device 102 described with respect to FIG. 2), a lyrics analyzer 506 (e.g., lyrics analyzing module 326 described with respect to FIG. 3), and a track generator 508 (e.g., track generator module 328 described with respect to FIG. 3).

In some embodiments, application 502 is configured to receive a text sentence (e.g., text sentence 505-1) from user device 504. Text sentence 505-1 includes a plurality of words arranged in a meaningful order. Note, however, that text sentence 505-1 need not be a full, grammatically complete, sentence. Rather, text sentence 505-1 should be construed as a string of identifiable words provided by a user. For example, text sentence 505-1 includes a text string or a text phrase. In some embodiments, text sentence 505-1 is a sentence or a phrase provided and/or defined by a user of user device 504. For example, the user provides text sentence 505-1 by writing a text sentence in a graphical user interface of user device 504. In some embodiments, the user provides the text sentence verbally (through speech), and the speech is converted to text. In some embodiments, text sentence 505-1 includes words in a particular language. In some embodiments, text sentence 505-1 includes words of two or more languages mixed together.

In some embodiments, application 502 is configured to transfer text sentence 505-1 received from user device 504 to lyrics analyzer 506. In some embodiments, lyrics analyzer 506 is an application based on a general programming language (e.g., a PYTHON® application). Lyrics analyzer 506 is in communication with audio track database 506-1 and timing database 506-2 (e.g., audio track database 506-1 and timing database 506-2 are stored in server data modules 330 described with respect to FIG. 3).

In some embodiments, lyrics analyzer 506 is configured to identify audio tracks (e.g., audio tracks indicated with a Uniform Resource Identifier (URI)) stored in audio track database 506-1 that include a respective word of text sentence 505-1. For each word of text sentence 505-1, lyrics analyzer 506 finds a set of audio tracks (e.g., a set including one or more audio tracks) that include the respective word. For example, text sentence 505-1 received from user device 504 includes the sentence "the sun is bright." Lyrics analyzer 506 thereby identifies that text sentence 505-1 includes the individual words "the," "sun," "is," and "bright" and identifies, for each of these respective words, a set of audio tracks, each of which includes the respective word.

In some instances, a respective word is found in multiple audio tracks and/or multiple times in an audio track. In some embodiments, lyrics analyzer 506 is configured to randomly select one of the audio tracks that include the respective word. In some embodiments, lyrics analyzer 506 selects an audio track that includes two or more respective words of text sentence 505-1 so that the audio tracks have common features (e.g., a common acoustic parameter). For example, lyrics analyzer 506 identifies a first track that includes a first word (e.g., the word "the") of text sentence 505-1 and a second track that includes the first word and a second word (e.g., the word "sun"). Lyrics analyzer 506 will select the second track because it includes the first and second words of text sentence 505-1 instead of just the first word.

In some embodiments, lyrics analyzer 506 is configured to select the set of audio tracks including a respective word of text sentence 505-1 based on audio features, such as volume, music genre, beat, pitch, etc. Forming an audible version of text sentence 505-1 from audio tracks having common features may increase the homogeneity (e.g., an audibility) of the audible version. In some embodiments, lyrics analyzer 506 makes a selection to prioritize audio tracks that include two or more adjacent words of text sentence 505-1 together. For example, if lyrics analyzer 506 identifies an audio track that includes the adjacent words "the sun is" out of text sentence 505-1 "the sun is bright," lyrics analyzer 506 will select such audio track. Selecting multiple words from the same audio track may increase the homogeneity of the audible version of text sentence 505-1.

In some embodiments, lyrics analyzer 506 is configured to analyze the audio tracks based on portions of words instead of words (e.g., less than the whole of the words). Thereby, lyrics analyzer 506 is configured to identify one or more audio tracks stored in audio track database 506-1 that include respective portions of the words of text sentence 505-1. In some embodiments, the portions of a word correspond to syllables or phonemes. A syllable corresponds to a unit of pronunciation having one vowel and may include or exclude surrounding consonants. For example, the word "sun" includes a single syllable and the word "summer" includes two syllables. A phoneme corresponds to a sound in a language having its own distinct sound. For example, the word "sun" includes three phonemes: /s/ /u/ and /n/. Functions of lyrics analyzer 506 are described herein with respect to identifying and analyzing words. However, in some embodiments, lyrics analyzer 506 performs similar functions with respect to portions of words, such as syllables or phonemes.

In some embodiments, lyrics analyzer 506 is further configured to obtain timing data identifying a start and end time of words in a respective identified audio track of the audio tracks that include the words of text sentence 505-1. In some embodiments, lyrics analyzer 506 returns audio track identifier/timestamp pairs 505-2 to application 502. The audio track identifier/timestamp includes an identifier (e.g., a URI) of the respective audio track paired with a start time and an end time of the respective word in the respective audio track. For example, an audio track identifier/timestamp pair 505-2 includes a URI of a first audio track identified as including a first word of text sentence 505-1. The audio track identifier/timestamp pair 505-2 further includes a start time and an end time for the first word in the first audio track. In some instances, the respective word occurs in the respective audio track multiple times. In some embodiments, lyrics analyzer 506 randomly selects one of the occurrences and includes a start and end time for that occurrence in the audio track identifier/timestamp pair.

In some embodiments, audio track database 506-1 and timing database 506-2 are distinct from each other. In some embodiments, timing database 506-2 is associated with audio track database 506-1 so that timing database 506-2 includes information related to audio tracks of audio track database 506-1.

In some embodiments, audio track database 506-1 includes a plurality of audio tracks that include vocals (e.g., each track of the plurality of tracks includes vocals). For example, a respective song track of audio track database 506-1 includes a vocal track including vocal lyrics and an instrumental track forming the respective song track. In some embodiments, audio track database 506-1 includes audio content items corresponding to songs, audiobooks, podcasts, and/or other audio content items. In some embodiments, the audio tracks include pronounced words. In some embodiments, the pronounced words are lyrics of a song or spoken language of an audiobook. In some embodiments, the pronounced words include words of a particular language or words of two or more languages.

In some embodiments, timing database 506-2 includes timing data identifying a start and end time of respective words in the respective audio track. For example, timing database 506-1 includes an indicator (e.g., a URI) of a respective audio track of audio track database 506-1 and, in connection with the indicator, a list of start and end times of respective words included in the respective audio track. In some embodiments, the start and end time of respective words are measured from the beginning of the audio track or from the end of the audio track. For example, a first audio track of audio track database 506-1 includes the word "sun" and timing database 506-2 includes a respective start and end time for the word "sun" measured from the beginning of the first audio track. In an instance that the word "sun" is repeated two or more times in the first audio track, the timing database 506-2 includes multiple start and end times for the word "sun." As explained above, timing database 506-2 may alternatively include timing data identifying a start and end time of respective syllables or phonemes of respective words in the respective audio track.

In some embodiments, audio track database 506-1 and timing database 506-2 are extracted from a database that includes vocal and/or instrumental tracks associated with a timing for a corresponding text version of the vocal track. In some embodiments, audio track database 506-1 and timing database 506-2 are extracted from a karaoke database. In such embodiments, a karaoke database includes an audio track including an instrumental track for a song and a vocal track for the song (e.g., including pronounced words of lyrics of the song). The karaoke database further includes timing information including start and end times for respective words of the lyrics of the song. In some embodiments, the audio track and the timing information are extracted separately from the karaoke database so that the audio track for the song is stored in audio track database 506-1 and the timing information is stored in timing database 506-2. In some embodiments, audio track database 506-1 and timing database 506-2 are extracts of an audiobook database. For example, an audiobook database includes a vocal track including the spoken language of the book and timing information including start and end times for respective words of the book.

In some embodiments, audio track database 506-1 and timing database 506-1 are generated using a speech recognition algorithm and/or other machine learning techniques. In some embodiments, the speech recognition methods and systems include those described in U.S. patent application Ser. No. 16/691,463 entitled "Systems and Methods for Aligning Lyrics using a Neural Network" filed Nov. 21, 2019, the content of which is herein incorporated in its entirety. In some embodiments, the speech recognition is configured to identify words included in the audio track and to identify an actual start time and an actual end time of a respective word within an audio track. In some embodiments, the speech recognition algorithm is configured to recognize textual units corresponding to portions of words. In some embodiments, the speech recognition algorithm is configured to recognize syllables or phonemes. In some embodiments, the speech recognition includes determining an initial estimate for a start time and an end time of a respective word in an audio track. A portion of the audio track selected based on the initial estimate of the start time and the end time of the respective word is then provided to a neural network (or other machine learning system) trained to identify the actual and accurate start and end times of words. For example, the portion of the audio track has been selected to include the portion of the audio track between the initially estimated start time and end time and additional predetermined time before the start time and additional predetermined time after the end time. In some embodiments, the neural network trained to identify the actual and accurate start and end times of words provides an updated start and end time for the respective word. The updated start and end times for the respective word are then stored in timing database 506-2 while the audio track associated with the updated start and end time for the respective word is stored at audio track database 506-1. In some embodiments, the initial estimate of the start time and the end time of the respective word in a song is obtained from a karaoke track including a vocal track, lyrics, and timing information and the portion of the audio track is selected based on an initial estimate of the start time and the end time received from the karaoke track.

In some embodiments, lyrics analyzer 506 is configured to provide audio track identifier/timestamp pairs 505-2 to application 502. In some embodiments, application 502 then provides audio track identifier/timestamp pairs 505-2 track generator 508. In some embodiments, track generator 508 is configured to generate an audible version of text sentence 505-1. Generating the audible version of text sentence 505-1 includes extracting, from the identified audio tracks, audio snippets corresponding to words of text sentence 505-1 (e.g., as described with respect to steps 510, 512, and 514 of process 1) and concatenating (e.g., merging) the audio snippets together to form an audible version of text sentence 505-1 (e.g., as described with respect to steps 516 and 518 of process 2).

In some embodiments, track generator 508 downloads (step 510) a first audio track of audio track identifier/timestamp pairs 505-2 from audio track database 506-1. Alternatively, track generator 508 receives the first audio track as cached data without a need for downloading. In some embodiments, track generator 508 then analyzes (step 512) the first audio track to identify words in the first audio track. In some embodiments, the analyzing is performed with machine learning methods known in the art. For example, the machine learning methods are trained to identify words sung or pronounced in audio data. In some embodiments, track generator 508 then divides the first audio track into multiple audio snippets (e.g., audio segments) wherein each of the audio segments includes a word. For example, the first audio track is modified to a format that includes appended metadata of the first audio track including audio snippets of individual words extracted from the first audio track. In some embodiments, track generator 508 then extracts (step 514) from the modified first audio track the first word as a first audio snippet. In some embodiments, the extracting includes selecting the first snippet including the first word based on the timing information identifying the start time and the end time for the first word in the first audio track (e.g., based on audio track identifier/timestamp pairs 505-2) and cutting off (e.g., isolating) the first audio snippet from the modified first audio track. In some embodiments, process 1 is repeated for all the respective audio tracks of audio tracks 505-2. In some embodiments, the number of audio tracks included in audio track identifier/timestamp pairs 505-2 corresponds to the number of words in text sentence 505-1. In such embodiments, each word of text sentence 505-1 is included in a respective audio track. For example, if the original text sentence 505-1 included four words (e.g., "the sun is bright"), track generator 508 repeats process 1 for four audio tracks each including a respective word of text sentence 505-1. Alternatively, the number of audio tracks included in audio track identifier/timestamp pairs 505-2 is more or less than the number of words in audio tracks. In such embodiments, a respective word may be included in two or more audio tracks or a single audio track includes two or more words of text sentence 505-1. For example, if the original text sentence 505-1 included four words (e.g., "the sun is bright"), track generator 508 repeats process 1 for two audio tracks each including two respective words of text sentence 505-1.

In some embodiments, track generator 508 then performs process 2 for forming an audible version of text sentence 505-1 received from user device 504 by concatenating (step 516) and mixing (step 518) the extracted audio snippets to form an audible track. In some embodiments, track generator 508 concatenates (e.g., joins) the individual extracted snippets corresponding to individual words of text sentence 505-1 in a series of consecutive audio snippets. The concatenating includes assembling the individual extracted snippets to a sequence corresponding to text sentence 505-1 such that the sequence of consecutive audio snippets forms an audible version of text sentence 505-1 (e.g., assembling into a single audio file or separate audio files that can be provided in a continuous manner to the user). In other words, the extracted snippets are arranged in the same order as the respective text words are in text sentence 505-1. For example, as was shown in FIG. 4 above, audio snippets 404-1, 404-2, 404-3, and 404-4 in audible version 406 are arranged in an order corresponding to the order of the corresponding words in text sentence 401 (e.g., audio snippets 404-1, 404-2, 404-3, and 404-4 are arranged in an order corresponding to text sentence 402, "the sun is bright"). In some embodiments, the audible version corresponds to a song version of text sentence 505-1 (e.g., the audible version sounds like a song). In some embodiments, the audible version corresponds to a pronounced version of text sentence 505-1 (e.g., the audible version sounds like a spoken sentence).

Track generator 508 then applies audio mixing software to the sequence of consecutive audio snippets and modifies them to improve audio quality (e.g., to make the sequence sound better to a user). In some embodiments, the modifying includes adjusting one or more acoustic parameters of the series of consecutive audio snippets. In some embodiments, the adjusting includes normalizing one or more acoustic parameters for providing a more uniform sound for the audible version of text sentence 505-1. In some embodiments, each of the audio snippets is adjusted with respect to the one or more acoustic parameters independently. For example, each of the audio snippets is normalized with respect to a predefined volume parameter. In some embodiments, all the audio snippets in the series of consecutive audio snippets are adjusted relative to each other. For example, the audio snippets in the series of consecutive audio snippets are appended together and normalized with respect to a common volume value (e.g., a predefined value or a highest volume identified among the audio snippets). In some embodiments, the one or more acoustic parameters are selected from the group consisting of a volume, a pitch, a peak rarefactional pressure, a peak compressional pressure, a derated peak rarefactional pressure, a derated peak compressional pressure, a spatial-peak pulse-average intensity, a derated spatial-peak pulse-average intensity, a mechanical index, an acoustic working frequency, a distance to start of pulse, a pulse duration, a pulse-intensity integral, and a derated pulse-intensity integral. For example, an audio mixing software normalizes a volume of each of the snippets in the series of consecutive audio snippets to match so that the sequence of consecutive audio snippets has a uniform volume. In some embodiments, the modifying includes adjusting one or more acoustic parameters of the series of consecutive audio snippets based on a predetermined condition. In some embodiments, the predetermined condition includes at least the ambient noise level and/or environmental metadata.

In some embodiments, track generator 508 then returns the modified sequence of consecutive audio snippets as audible version of text sentence 505-3 to application 502. In some embodiments, audible version of text sentence 505-3 is processed into a single audio file (e.g., in an MP3-file format). In some embodiments, application 502 provides audible version of text sentence 505-3 to user device 504 for playback (e.g., as an MP3 file).

Figure 6A:
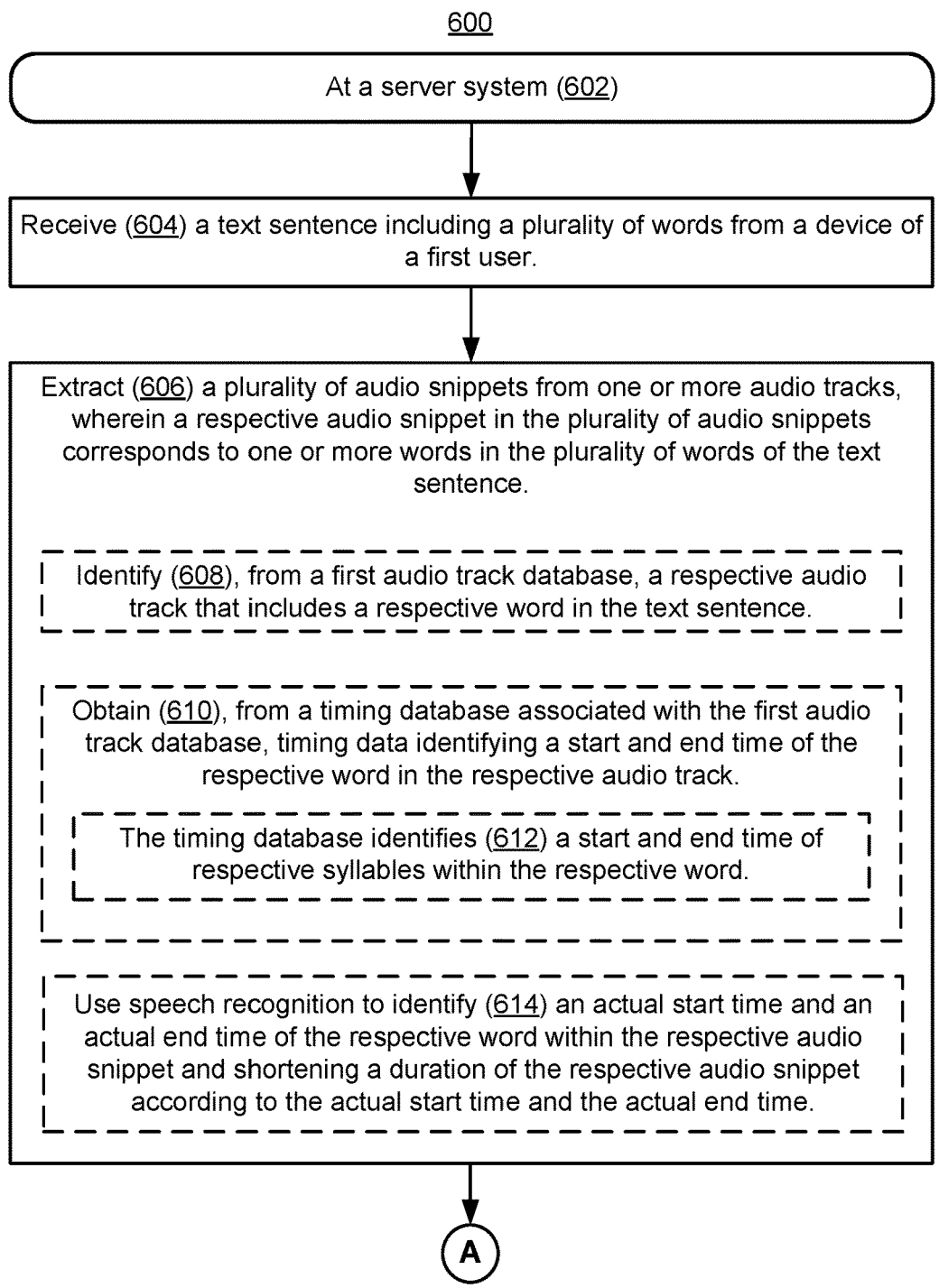
FIG. 6A-6C are flow diagrams illustrating a method of creating an audible version of a text sentence for playback at a user device, in accordance with some embodiments.
Figure 6B:
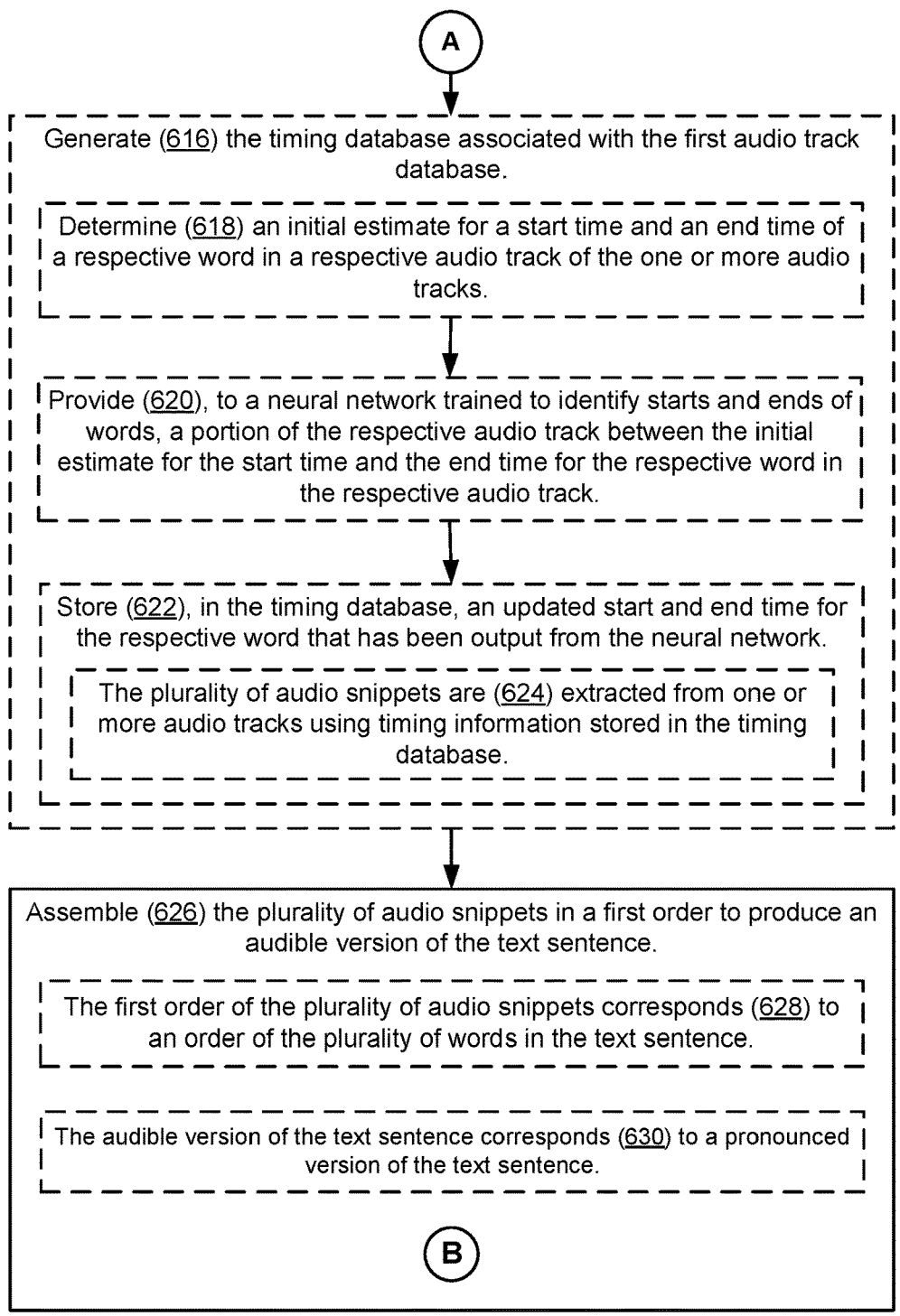
Figure 6C:
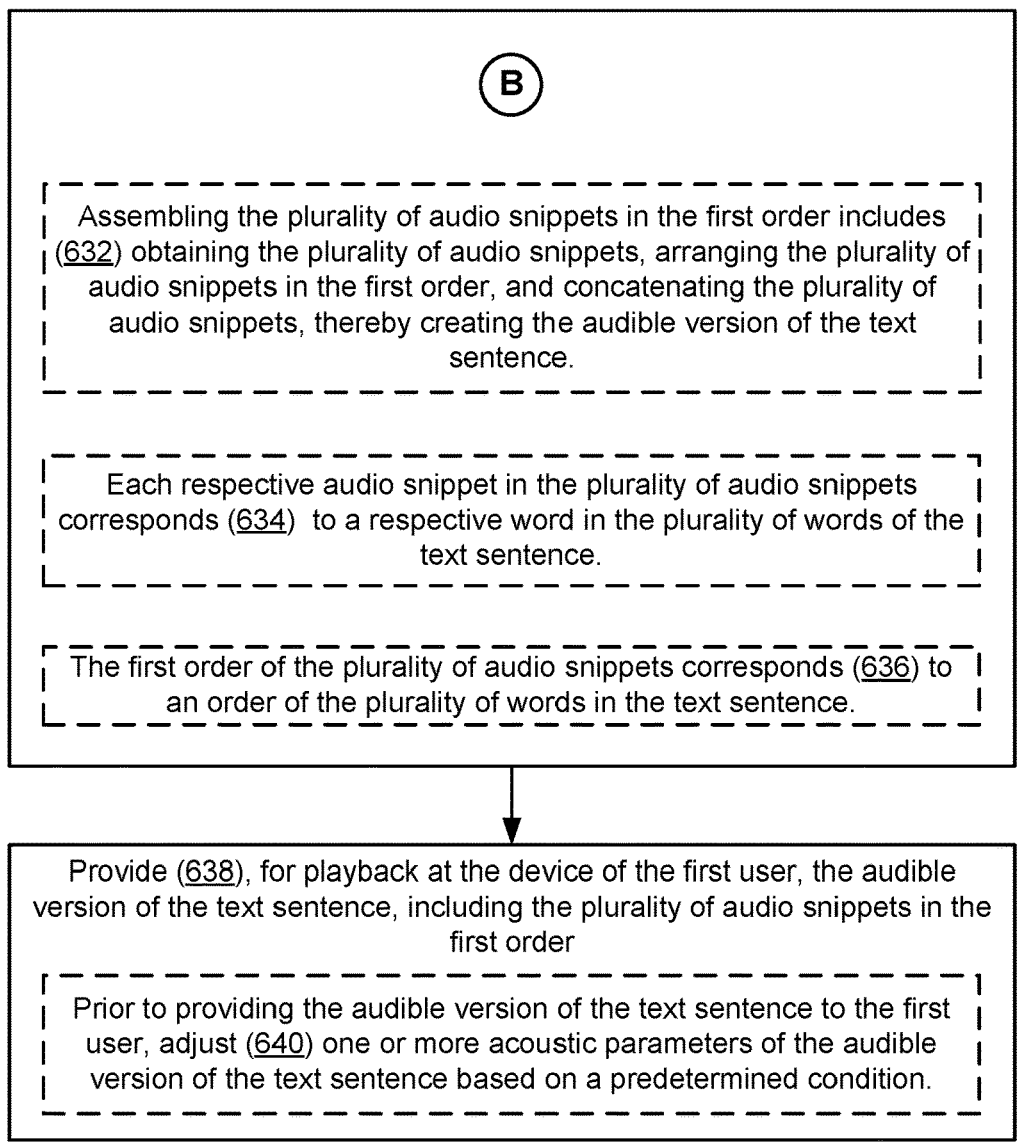

FIGS. 6A-6C are flow diagrams illustrating a method of creating an audible version of a text sentence for playback at a user device, in accordance with some embodiments. Dashed boxes indicate features that are optional in FIGS. 6A-6C.

Method 600 is performed at a server system (602) (e.g., of a media-providing service). In some embodiments, the server system corresponds to media content server 104 described with respect to FIGS. 1 and 3. The server system has one or more processors (e.g., CPU(s) 302) and memory (e.g., memory 306) storing instructions for execution by the one or more processors. The server system is in communication with a client device (e.g., electronic device 102 described with respect to FIG. 2).

Method 600 includes receiving (604) a text sentence (e.g., a text string, or a text phrase) including a plurality of words from a device of a first user. For example, application 502 of a media server system receives text sentence 505-1 from user device 504 in FIG. 5 (e.g., through a keyboard or through speech-to-text). Text sentence 505-1 includes a plurality of words (e.g., text sentence 402 in FIG. 4, "the sun is bright").

Method 600 includes extracting (606) a plurality of audio snippets (e.g., audio segments) from one or more audio tracks (e.g., where the audio tracks are distinct from the text sentence received from the user). A respective audio snippet in the plurality of audio snippets corresponds to one or more words in the plurality of words of the text sentence (e.g., an audio snippet is a portion, less than all, of an audio track, where the portion of the audio track includes only the corresponding one or more words from the text sentence). For example, a first audio snippet includes a first word of the text sentence and a second audio snippet distinct from the first audio snippet includes a second word of the text sentence. As another example, the first audio snipped includes the first word and the second word so that the first word and the second word are adjacent words of the text sentence and in an order corresponding to the order of the first word and the second word in the text sentence.

In some embodiments, extracting the respective audio snippet from the one or more audio tracks includes identifying (608), from a first audio track database, a respective audio track that includes a respective word in the text sentence. For example, lyrics analyzer 506 identifies, from among audio tracks stored in audio track database 506-1, a first audio track that includes a first word of the text sentence 505-1 (e.g., the word "the" in "the sun is bright").

In some embodiments, the one or more audio tracks (e.g., audio tracks of audio track database 506-1) include a song, a podcast, or an audiobook. In some embodiments, the one or more audio tracks include pronounced words. For example, the one or more audio tracks are songs that include lyrics or audiobooks including spoken language. In some embodiments, the one or more audio tracks represent a common music genre (e.g., hip hop, blues, pop, opera, etc.). In some embodiments, the one or more audio tracks have a matching beat. Note that, as used herein, the term "matching" or "matched" means within a predefined threshold (e.g., wherein the predefined threshold is selected to improve audibility). For example, the one or more audio tracks are selected from audio tracks that characterized as hip hop music and the one or more audio tracks have a matching beat (e.g., a beat within a predefined beat range). In some embodiments, selecting the one or more audio tracks from a common music genre and/or having a matching beat increases the audio quality audible version of the text sentence (e.g., making the audible version of the text sentence more homogenous so that it sounds better). In some embodiments, the one or more audio tracks have a corresponding volume. In some embodiments, using audio snippets with similar or corresponding volumes prevents a low volume snippet being "drowned" in adjacent audio snippets with a high volume.

In some embodiments, the pronounced words include words in one or more distinct languages. In some embodiments, method 600 is applied to a specific language. For example, when text sentence 505-1 includes words from a single language, lyrics analyzer 506 identifies the one or more audio tracks from audio tracks that include the specific language. In some embodiments, method 600 is applied to two or more languages. For example, when text sentence 505-1 includes words from two or more languages, lyrics analyzer 506 identifies the one or more audio tracks from audio tracks that include the two or more languages.

In some embodiments, extracting the respective audio snippet includes obtaining (610), from a timing database (e.g., timing database 506-1) associated with the first audio track database, timing data identifying a start and end time of the respective word in the respective audio track. In some embodiments, the timing database includes start and end times of respective of respective words (e.g., of lyrics) in respective audio tracks stored in the first database. For example, timing database 506-1 includes a start time and an end time for the first word "the" of the text sentence determined from the beginning of the respective audio track. In some embodiments, the first audio track database is distinct from the timing database. In some embodiments, the first audio track database and the timing database are extracts from (or comprise) a database for playing karaoke. In some embodiments, instead of identifying a first audio track that includes the first word, lyrics analyzer 506 identifies an audio track including a respective syllable (e.g., a first syllable of the first word). In such embodiments, the timing database identifies (612) a start and end time of a respective syllable in the first audio track. In some embodiments, lyrics analyzer 506 identifies an audio track including a respective phonemes and the timing database identifies a start and end time of a respective phonemes in the first audio track.

In some embodiments, method 600 further includes using speech recognition (or other machine learning technique) to identify (614) an actual start time and an actual end time of the respective word within the respective audio snippet and shortening a duration of the respective audio snippet according to the actual start time and the actual end time. For example, lyrics analyzer 506, after identifying the first audio track including the first word of text sentence 505-1 and obtaining timing information for the first word, applies speech recognition to identify more accurate (i.e., actual) start time and end time for the first word.

In some embodiments, method 600 includes generating (616) a timing database (e.g., timing database 506-2) associated with the first audio track database. In some embodiments, generating the timing database associated with the first audio track database includes determining (618) an initial estimate for a start time and an end time of a respective word in a respective audio track of the one or more audio tracks. In some embodiments, generating the timing database includes providing (620), to a neural network trained to identify starts and ends of words, a portion of the respective audio track between the initial estimate for the start time and the end time for the respective word in the respective audio track. In some embodiments, generating the timing database includes storing (622), in the timing database, an updated start and end time for the respective word that has been output from the neural network. In some embodiments, the plurality of audio snippets is (624) extracted from one or more audio tracks using timing information stored in the timing database. For example, the initial estimate for the start time and the end time could be obtained from karaoke track including lyrics for a respective audio track and estimated start time and end time for each word. As another example, the initial estimate for the start time and the end time could be obtained from an speech recognition algorithm. Based on the initial estimate for the start time and the end time, a neural network trained to identify words in audio tracks, identifies updated, more accurate start time and end time for each word. In some embodiments, the updated timing information is stored at the timing database 506-2.

In some embodiments, method 600 includes separating, prior to generating the timing database associated with the first audio track database, the respective audio track into a vocal track and an instrumental track. For example, lyrics analyzer 506 uses vocal separation technologies known in the art to separate the first audio track identified to include the first word of text sentence 505-1 to a vocal track and an instrumental track.

In some embodiments, method 600 includes assembling (626) the plurality of audio snippets in a first order to produce an audible version of the text sentence. In some embodiments, the first order of the plurality of audio snippets corresponds (628) to an order of the plurality of words in the text sentence. In some embodiments, the audible version of the text sentence corresponds (630) to a pronounced version of the text sentence. For example, audible version of text sentence 505-3 includes same words arranged in the same order as text sentence 505-1 so that a first audio snippet of the plurality of audio snippets corresponds to text sentence 505-1. As illustrated in FIG. 4, audio snippet 404-4 of audible version 406 of text sentence 402 corresponds to the first word of text sentence 402 (i.e., the word "the"), audio snippet 404-2 of audible version 406 of text sentence 402 corresponds to the second word of text sentence 402 (i.e., the word "sun"), audio snippet 404-3 of audible version 406 of text sentence 402 corresponds to the third word of text sentence 402 (i.e., the word "is"), and audio snippet 404-1 of audible version 406 of text sentence 402 corresponds to the fourth word of text sentence 402 (i.e., the word "bright").

In some embodiments, assembling (626) the plurality of audio snippets in the first order includes (632) obtaining the plurality of audio snippets, arranging the plurality of audio snippets in the first order, and concatenating the plurality of audio snippets, thereby creating the audible version of the text sentence (e.g., as a single audio file, or as separate audio files provided to the user in a continuous manner).

In some embodiments, obtaining a respective audio snippet includes analyzing (e.g., by track analyzer 508) a respective audio snippet to identify words in a respective audio track. In some embodiments, the analysis is performed with machine learning methods known in the art. For example, the machine learning methods are trained to identify words sung or pronounced in audio data, or more specifically in songs. In some embodiments, the first audio track is then divided into multiple audio snippets (e.g., audio segments) wherein each of the audio segments includes a word. In some embodiments, dividing the first audio track to multiple audio snippets includes modifying the first audio track into a format that includes appended metadata of the first audio track including snippets of individual words of the first audio track. In some embodiments, a snippet including the respective word is then extracted from the modified first audio track.

In some embodiments, the extracting includes selecting a first snippet including the first word based on the timing information identifying the start time and the end time for the first word in the first audio track and cutting off (e.g., isolating) the first snippet from the modified first audio track. The extracting is repeated for all the respective audio tracks of audio tracks 505-2. In some embodiments, the number of audio tracks included in audio track identifier/timestamp pairs 505-2 corresponds to the number of words in text sentence 505-1. In such embodiments, each word of text sentence 505-1 is included in a respective audio track. For example, if the original text sentence 505-1 included four words (e.g., "the sun is bright"), track generator 508 repeats process 1 for four audio tracks each including a respective word of text sentence 505-1. Alternatively, the number of audio track included in audio track identifier/timestamp pairs 505-2 is more or less than the number of words in audio tracks. In such embodiments, a respective word may be included in two or more audio tracks or a single audio track includes two or more words of text sentence 505-1. For example, if the original text sentence 505-1 included four words (e.g., "the sun is bright"), track generator 508 repeats process 1 for two audio tracks each including two respective words of text sentence 505-1.

In some embodiments, obtaining the plurality of audio snippets includes downloading the one or more audio tracks (e.g., track generator 508 downloads audio track identifier/timestamp pairs 505-2 from audio track database 506-1).

In some embodiments, each respective audio snippet in the plurality of audio snippets corresponds (634) to a respective word in the plurality of words of the text sentence. For example, as shown in FIG. 4, audio snippets 404-1, 404-2, 404-3, and 404-4 correspond to words of text sentence 402, "the sun is bright." In some embodiment, the first order of the plurality of audio snippets corresponds (636) to an order of the plurality of words in the text sentence.

Method 600 includes providing (638), for playback at the device of the first user, the audible version of the text sentence, including the plurality of audio snippets in the first order. For example, application 502 provides audible version of text sentence 505-3 to user device 504 for playback. In some embodiments, the audible version of text sentence 505-3 is an MP3 file.

In some embodiments, method 600 includes, prior to providing the audible version of the text sentence to the first user, adjusting (640) (e.g., normalizing) one or more acoustic parameters of the audible version of the text sentence based on a predetermined condition. (e.g., the predetermined condition includes at least ambient noise level or environmental metadata). In some embodiments, the one or more acoustic parameters are selected from the group consisting of: a volume, a pitch, a peak rarefactional pressure, a peak compressional pressure, a derated peak rarefactional pressure, a derated peak compressional pressure, a spatial-peak pulse-average intensity, a derated spatial-peak pulse-average intensity, a mechanical index, an acoustic working frequency, a distance to start of pulse, a pulse duration, a pulse-intensity integral, and a derated pulse-intensity integral. In some embodiments, concatenating the plurality of audio snippets further includes applying an audio mixing software to the plurality concatenated audio snippets to modify the plurality of audio snippets for improved audio quality (e.g., to make the sequence sound better to a user).

Although FIGS. 6A-6C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a server system, the server system having one or more processors and memory storing instructions for execution by the one or more processors:
receiving a text sentence including a plurality of words from a device of a first user;
identifying, from a first audio track database, a respective audio track that includes a respective word of the plurality of words in the text sentence received from the device of the first user; and
obtaining, from a timing database distinct from the first audio track database, timing data identifying a start time and an end time of the respective word in the respective audio track;
extracting a plurality of audio snippets from one or more audio tracks, including extracting a respective audio snippet having the start time and the end time of the respective word in the respective audio track, wherein the respective audio snippet in the plurality of audio snippets corresponds to one or more words in the plurality of words of the text sentence;
assembling the plurality of audio snippets in a first order to produce an audible version of the text sentence; and
providing, for playback at the device of the first user, the audible version of the text sentence, including the plurality of audio snippets from the one or more audio tracks in the first order.

2. The method of claim 1, wherein the timing database identifies a start and end time of respective syllables within the respective word.

3. The method of claim 1, further comprising generating the timing database associated with the first audio track database, including:
determining an initial estimate for the start time and the end time of the respective word in a respective audio track of the one or more audio tracks;
providing, to a neural network trained to identify starts and ends of words, a portion of the respective audio track between the initial estimate for the start time and the end time for the respective word in the respective audio track; and
storing, in the timing database, an updated start and end time for the respective word that has been output from the neural network.

4. The method of claim 3, further including, prior to generating the timing database associated with the first audio track database, separating the respective audio track into a vocal track and an instrumental track.

5. The method of claim 3, further including using speech recognition to identify an actual start time and an actual end time of the respective word within the respective audio snippet and shortening a duration of the respective audio snippet according to the actual start time and the actual end time.

6. The method of claim 1, wherein the one or more audio tracks include a song, a podcast, or an audiobook.

7. The method of claim 1, wherein the one or more audio tracks include pronounced words.

8. The method of claim 7, wherein the pronounced words include words in one or more distinct languages.

9. The method of claim 1, wherein the first order of the plurality of audio snippets corresponds to an order of the plurality of words in the text sentence.

10. The method of claim 1, wherein the audible version of the text sentence corresponds to a pronounced version of the text sentence.

11. The method of claim 1, wherein the one or more audio tracks represent a common music genre.

12. The method of claim 1, wherein the one or more audio tracks have a matching beat.

13. The method of claim 1, wherein the one or more audio tracks have a matching volume.

14. The method of claim 1, wherein assembling the plurality of audio snippets in the first order includes:
obtaining the plurality of audio snippets;
arranging the plurality of audio snippets in the first order; and
concatenating the plurality of audio snippets, each respective audio snippet in the plurality of audio snippets corresponding to a respective word in the plurality of words of the text sentence, thereby creating the audible version of the text sentence.

15. The method of claim 1, further including, prior to providing the audible version of the text sentence to the first user, adjusting one or more acoustic parameters of the audible version of the text sentence based on a predetermined condition.

16. The method of claim 15, wherein the one or more acoustic parameters are selected from the group consisting of: a volume, a pitch, a peak rarefactional pressure, a peak compressional pressure, a derated peak rarefactional pressure, a derated peak compressional pressure, a spatial-peak pulse-average intensity, a derated spatial-peak pulse-average intensity, a mechanical index, an acoustic working frequency, a distance to start of pulse, a pulse duration, a pulse-intensity integral, and a derated pulse-intensity integral.

17. A server system, the server system having one or more processors and memory storing instructions for execution by the one or more processors, the instructions including instructions for:
receiving a text sentence including a plurality of words from a device of a first user;
identifying, from a first audio track database, a respective audio track that includes a respective word of the plurality of words in the text sentence received from the device of the first user; and
obtaining, from a timing database distinct from the first audio track database, timing data identifying a start time and an end time of the respective word in the respective audio track;
extracting a plurality of audio snippets from one or more audio tracks, including extracting a respective audio snippet having the start time and the end time of the respective word in the respective audio track, wherein the respective audio snippet in the plurality of audio snippets corresponds to one or more words in the plurality of words of the text sentence;
assembling the plurality of audio snippets in a first order to produce an audible version of the text sentence; and
providing, for playback at the device of the first user, the audible version of the text sentence, including the plurality of audio snippets from the one or more audio tracks in the first order.

18. A non-transitory computer-readable storage medium storing instructions that, when executed by a server system, cause the server system to:
- receive a text sentence including a plurality of words from a device of a first user;
- identify, from a first audio track database, a respective audio track that includes a respective word of the plurality of words in the text sentence received from the device of the first user; and
- obtain, from a timing database distinct from the first audio track database, timing data identifying a start time and an end time of the respective word in the respective audio track;
- extract a plurality of audio snippets from one or more audio tracks, including extracting a respective audio snippet having the start time and the end time of the respective word in the respective audio track, wherein the respective audio snippet in the plurality of audio snippets corresponds to one or more words in the plurality of words of the text sentence;
- assemble the plurality of audio snippets in a first order to produce an audible version of the text sentence; and
- provide, for playback at the device of the first user, the audible version of the text sentence, including the plurality of audio snippets from the one or more audio tracks in the first order.

\* \* \* \* \*